US012620885B2

(12) United States Patent
Yi et al.

(10) Patent No.: US 12,620,885 B2
(45) Date of Patent: May 5, 2026

(54) CONVERTER

(71) Applicant: LG INNOTEK CO., LTD., Seoul (KR)

(72) Inventors: Je Hyun Yi, Seoul (KR); Byung Kwon Lee, Seoul (KR); Jae Ho Choi, Seoul (KR); Eun Hyuk Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 188 days.

(21) Appl. No.: 18/575,057

(22) PCT Filed: Jun. 27, 2022

(86) PCT No.: PCT/KR2022/009129
§ 371 (c)(1),
(2) Date: Dec. 28, 2023

(87) PCT Pub. No.: WO2023/277483
PCT Pub. Date: Jan. 5, 2023

(65) Prior Publication Data
US 2024/0339919 A1      Oct. 10, 2024

(30) Foreign Application Priority Data
Jun. 28, 2021      (KR) ........................ 10-2021-0084086

(51) Int. Cl.
*H02M 1/00*          (2006.01)
*B60L 53/22*         (2019.01)
*H02M 1/42*          (2007.01)

(52) U.S. Cl.
CPC ............. *H02M 1/007* (2021.05); *B60L 53/22* (2019.02); *H02M 1/0083* (2021.05); *H02M 1/4208* (2013.01)

(58) Field of Classification Search
CPC .. H02M 1/007; H02M 1/0083; H02M 1/4208; B60L 53/22
See application file for complete search history.

(56) References Cited

U.S. PATENT DOCUMENTS

2010/0296319 A1    11/2010  Liu
2010/0314937 A1    12/2010  Jacobson et al.
2022/0231537 A1*    7/2022  Hirota ....................... H02J 7/16

FOREIGN PATENT DOCUMENTS

CN          110429671 B        12/2020
DE     10 2018 210 579 A1      1/2020
(Continued)

OTHER PUBLICATIONS

Supplementary European Search Report dated May 20, 2025 in European Application No. 22833539.4.
(Continued)

*Primary Examiner* — Adolf D Berhane
(74) *Attorney, Agent, or Firm* — Saliwanchik, Lloyd & Eisenschenk

(57)          ABSTRACT
A converter according to one embodiment of the present invention comprises: a first converter and a second converter for converting the input voltage into a first level voltage; a switching unit which connects the first converter and the second converter in series or in parallel; and an output unit to which the output terminal of the first converter and the output terminal of the second converter are connected in parallel.

13 Claims, 8 Drawing Sheets

<u>200</u>

(56)         References Cited

FOREIGN PATENT DOCUMENTS

| JP | 2009-261230 A | 11/2009 |
| KR | 10-2021-0029801 A | 3/2021 |
| WO | 2020/230202 A1 | 11/2020 |

OTHER PUBLICATIONS

Office Action dated Aug. 14, 2025 in Korean Application No. 10-2021-0084086.
International Search Report dated Oct. 17, 2022 in International Application No. PCT/KR2022/009129.

\* cited by examiner (A)

(B)

(A)

(B)

FIG. 10(A)
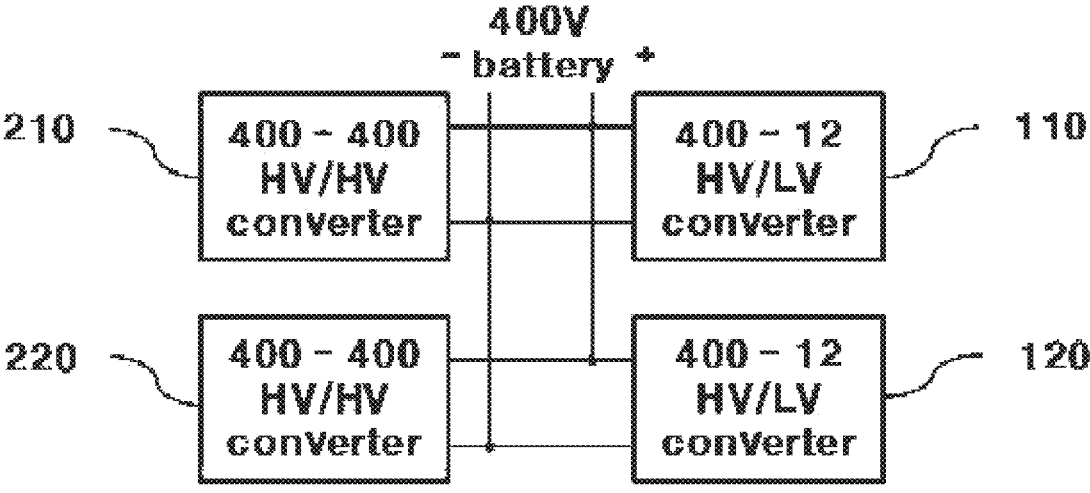
(A)
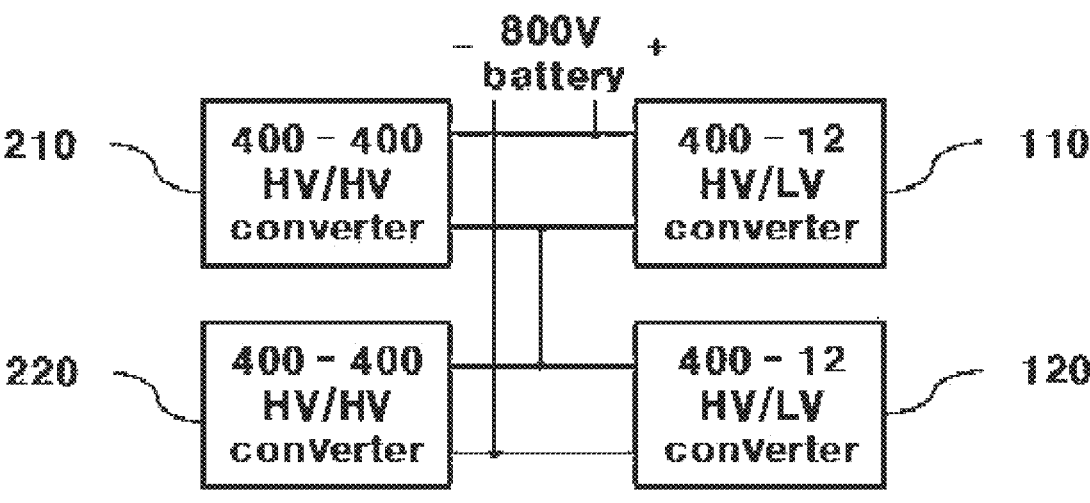
(B)
FIG. 10(B)

CONVERTER

CROSS-REFERENCE TO RELATED APPLICATIONS

This application is the U.S. national stage application of International Patent Application No. PCT/KR2022/009129, filed Jun. 27, 2022, which claims the benefit under 35 U.S.C. § 119 of Korean Application No. 10-2021-0084086, filed Jun. 28, 2021, the disclosures of each of which are incorporated herein by reference in their entirety.

TECHNICAL FIELD

The present invention relates to a converter, and more specifically, to a converter and power module that can be used for a wide range of input voltages with a single converter.

BACKGROUND ART

The required capacity of batteries installed and used in vehicles such as hybrid vehicles and electric vehicles is increasing. Previously, only 400 V batteries were used, but recently, attempts to use 800 V batteries in combined ways are increasing.

The power module being ap to the vehicle must convert external power source to a voltage suitable for charging the battery. As shown in FIG. 1, since the external power source is an alternating current input, the alternating current input is converted into a direct current through a power factor corrector (PFC) that receives the alternating current input, and it is converted into a voltage suitable for charging the battery 3 through the HV/HV converter 2 to charge the battery 3. Thereafter, the power stored in the battery 3 is provided to the vehicle, and at this time, it is converted to a low voltage suitable for providing to devices within the vehicle through the HV/LV converter 4.

Recently, the capacity of the battery 3 is used by connecting it to 400 V or 800 V, but there is a problem in that high-efficiency operation is not possible when operating 400 V to 800 V battery voltage range with a single converter, and it is difficult to cover the entire range when designing magnetic elements.

DETAILED DESCRIPTION OF THE INVENTION

Technical Subject

The technical problem to be solved by the present invention is to provide a converter and power module compatible with a wide range of input voltages with a single converter.

Technical Solution

In order to solve the above technical problem, a converter according to an embodiment of the present invention comprises: a first converter and a second converter that convert the input voltage into a first level voltage; a switching unit that connects the first converter and the second converter in series or in parallel; and an output unit to which the output terminal of the first converter and the output terminal of the second converter are connected in parallel.

In addition, the switching unit may comprise: a first switching element being disposed between the (−) terminal of the first converter and the (−) terminal of the second converter; a second switching element being disposed between the (+) terminal of the first converter and the (+) terminal of the second converter; and a third switching element being disposed between the (−) terminal of the first converter and the (+) terminal of the second converter.

In addition, when the input voltage being applied to the converter is a first value, the first switching element and the second switching element are in an on state and the third switching element is in an off state; and when the input voltage being applied to the converter is a second value, the first switching element and the second switching element are in an off state and the third switching element may be in an on state.

In addition, it may include a control unit that controls the switching unit according to the magnitude of the input voltage being applied to the converter.

In addition, the control unit controls the switching unit so that the first converter and the second converter are connected in parallel when the magnitude of the input voltage is a first value, and may control the switching unit so that the first converter and the second converter are connected in series when the magnitude of the input voltage is a second value.

In addition, the first value may be smaller than the second value.

In addition, the first converter and the second converter may have the same specifications.

In order to solve the above technical problem, the power module according to an embodiment of the present invention comprises: a power factor correction unit that converts an alternating current input into a direct current; a third converter and a fourth converter that convert the output voltage of the power factor correction unit into a second level voltage; a first converter and a second converter that convert the input voltage into a first level voltage; a first switching unit that connects the third converter and the fourth converter in series or in parallel; a second switching unit that connects the first converter and the second converter in series or in parallel; and an output unit where the output terminal of the first converter and the output terminal of the second converter are connected in parallel, wherein the output terminal of the third converter is connected to the input terminal of the first converter, and wherein the output terminal of the fourth converter is connected to the input terminal of the second converter.

In addition, it may include a battery input/output terminal being connected between the output terminal of the third converter and the input terminal of the first converter, and between the output terminal of the fourth converter and the input terminal of the second converter.

In addition, the first converter and the second converter may receive the output voltage of the third converter and the output voltage of the fourth converter, respectively, or may receive a battery voltage from the battery input/output terminal.

In addition, when the voltage of the battery being connected to the battery input/output terminal is a first value, the first converter and the second converter are connected in parallel; and when the voltage of the battery being connected to the battery input/output terminal is a second value, the first converter and the second converter may be connected in series.

In addition, the first switching unit may include: a fourth switching element being disposed between the (−) terminal of the third converter and the (−) terminal of the fourth converter; a fifth switching element being disposed between the (+) terminal of the third converter and the (+) terminal of the fourth converter; and a sixth switching element being disposed between the (−) terminal of the third converter and the (+) terminal of the fourth converter.

In addition, when the alternating current voltage being inputted to the power factor correction unit is single-phase, the fourth switching element and the fifth switching element are in an on state and the sixth switching element is in an off state; and when the alternating current voltage being inputted to the power factor correction unit is three-phase, the fourth switching element and the fifth switching element are in an off state and the sixth switching element may be in an on state.

In addition, the switching unit may comprises: a first switching element being disposed between the (−) terminal of the first converter and the (−) terminal of the second converter; a second switching element being disposed between the (+) terminal of the first converter and the (+) terminal of the second converter; and a third switching element being disposed between the (−) terminal of the first converter and the (+) terminal of the second converter.

In addition, the second level may be larger than the first level.

Advantageous Effects

According to embodiments of the present invention, it is possible to design using a single converter regardless of the input voltage. Additionally, it is possible to design using a converter with low specifications and reduce the number of electrolytic capacitors required. Furthermore, it is advantageous in terms of size and efficiency of the entire power module.

BRIEF DESCRIPTION OF DRAWINGS

FIGS. 8 to 10(B) are diagrams for explaining the operation of a power module according to an embodiment of the present invention.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or disposed in "on (above)" or "below (under)" of each component, "on (above)" or "below (under)" means that it includes not only the case where the two components are directly in contact with, but also the case where one or more other components are formed or disposed between the two components. In addition, when expressed as "on (above)" or "below (under)", the meaning of not only an upward direction but also a downward direction based on one component may be included.

Figure 1:
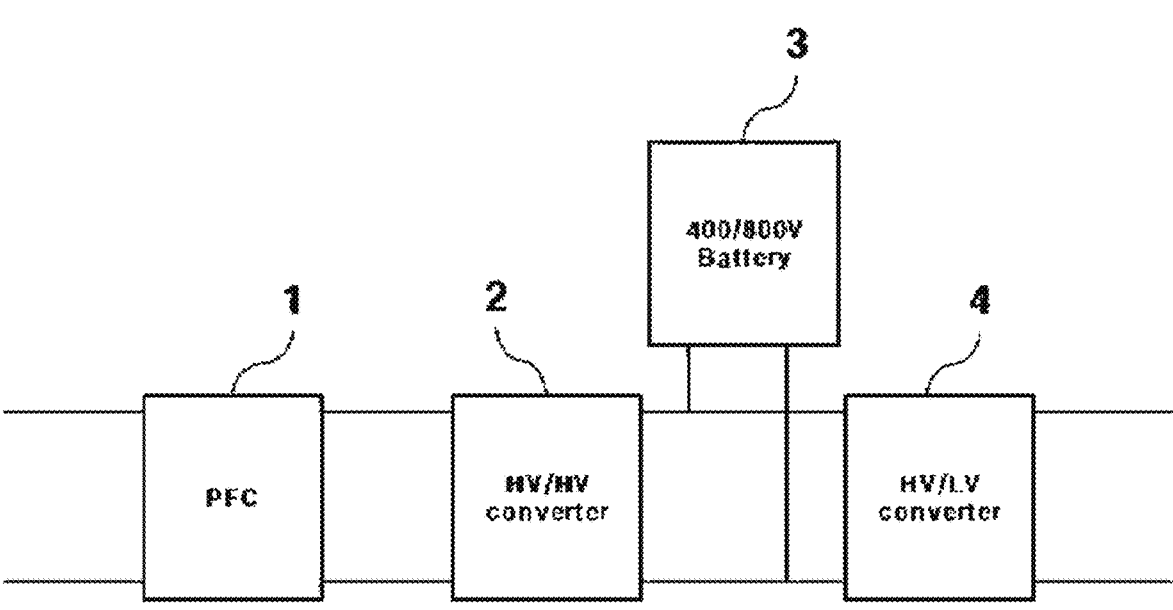
FIG. 1 is a block diagram of a power module according to a comparative example of the present invention.
Figure 2:
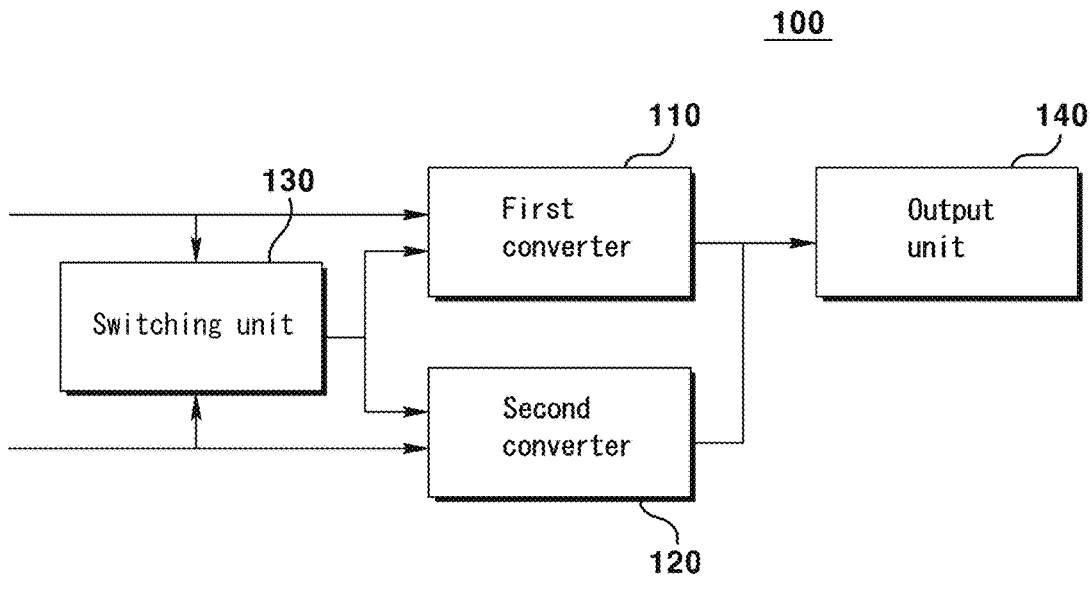
FIG. 2 is a block diagram of a converter according to an embodiment of the present invention.

FIG. 2 is a block diagram of a converter according to an embodiment of the present invention.

The converter 100 according to an embodiment of the present invention consists of a first converter 110, a second converter 120, a switching unit 130, and an output unit 140, and may further include a control unit 150 or a converter other than the first converter 110 and the second converter 120. The converter 100 according to an embodiment of the present invention may be a converter 100 being mounted on a vehicle, and it may receive power from a battery or external power source and convert it into a voltage level of power source to be provided to devices inside a vehicle. Or, it can be applied to various devices with a wide range of input voltage.

The first converter 110 and the second converter 120 convert voltages being inputted into a voltage of a first level.

More specifically, the first converter 110 and the second converter 120 are connected in series or in parallel depending on the connection state of the switching unit 130; and the converters convert input voltages into a first level voltage. The first converter 110 and the second converter 120 may be DC-DC converters or other types of converters such as DC-AC converters. The first level voltage may be the voltage required for the load being connected to the output unit 140. For example, when devices inside a vehicle, such as a wiper, are connected to the output unit 140, the devices use 12 V as the rated voltage, and the first level voltage may be 12 V. The first level voltage may be a fixed value or a variable value.

The size of the battery or external power voltage may be a voltage higher than the first level voltage, and the first converter 110 and the second converter 120 may be HV/LV converters that convert a high voltage to a low voltage. For example, the input voltage being inputted to the converter may be 400 V or 800 V, the output voltage may be 12 V, and the first converter 110 and the second converter 120 may be 400-12 HV/LV converters. Or, the first converter 110 and the second converter 120 may be an HV-HV converter, an LV-LV converter, or an LV-HV converter.

The first converter 110 and the second converter 120 may be converters having the same specifications. Here, identical specifications mean that there is a difference in specifications within an error range or a critical range, and it is natural that it does not mean complete identicalness. They may have the same specifications in terms of rated voltage, voltage transformation ratio, power, etc. For example, the first converter 110 and the second converter 120 may have a voltage transformation ratio that converts a voltage in the range of 380 V to 400 V to 12 V, and may be a converter with a power of 5 KW. Additionally, it is natural that the first converter 110 and the second converter 120 may be converters having different specifications.

The switching unit 130 connects the first converter 110 and the second converter 120 in series or in parallel.

More specifically, the switching unit 130 may perform a switching operation so that the first converter 110 and the second converter 120 are connected in series or in parallel. The switching unit 130 is connected to the input terminal of the first converter 110 and the input terminal of the second converter 120, and here, the positions in series or in parallel mean the input terminal of the first converter 110 and the input terminal of the second converter 120. Unless the output terminal of each converter is specified separately, hereinafter, serial or parallel connection refers to the input terminal of each converter.

When the first converter 110 and the second converter 120 are connected in series, the input voltage is divided to be inputted to each converter, and when connected in parallel, the input voltage is equally inputted to each converter. The switching unit 130 operates according to the input voltage being inputted to the converter to connect the first converter 110 and the second converter 120 in series or in parallel. When the input voltage is within the rated voltage range of the first converter 110 and the second converter 120, the first converter 110 and the second converter 120 are connected in parallel to convert the input voltage, respectively, and when the input voltage is greater than the rated voltage range of each converter, the first converter 110 and the second converter 120 may be connected in series to distribute and convert the input voltage. Through this, conversion operation is possible even when a voltage greater than the rated voltage of each converter is inputted and it can be designed to perform conversion within a high efficiency range rather than a wide range of rated voltages. When the input voltage is of multiple types or has a wide voltage range, each converter can be designed to convert a lower input voltage among different types of input voltage, or a converter with a corresponding rated voltage can be used. When the input voltage greater than the rated voltage for which each converter is designed is inputted, the input voltage can be converted through voltage distribution. That is, by connecting the first converter 110 and the second converter 120 in series or in parallel, it becomes possible to be used for multiple types or a wide range of input voltages. For example, the input voltage is 400 V or 800 V, and each converter may be a converter that converts 400 V to 12 V. When the input voltage is 400 V, the first converter 110 and the second converter 120 are connected in parallel, and when the input voltage is 800 V, the first converter 110 and the second converter 120 are connected in series. When connected in series, the voltage being inputted to each converter becomes 400 V due to the voltage distribution. In other words, even if the input voltage is different, each converter only needs to convert 400 V to 12 V, which can increase efficiency.

In the output unit 140, the output terminal of the first converter 110 and the output terminal of the second converter 120 are connected in parallel.

More specifically, the output unit 140 can be connected to a load, the output terminal of the first converter 110 and the output terminal of the second converter 120 are connected in parallel, and the voltage being changed and outputted from each converter is outputted. Devices inside the vehicle or a battery may be connected to the output unit 140 to provide a 12 V voltage being converted and outputted from the first converter 110 and the second converter 120.

The output unit 140 may include a plurality of switches, and the output terminal of the first converter 110 and the output terminal of the second converter 120 may be connected in parallel or in series. Depending on the voltage required for the load being connected to the output unit 140, the output terminal of each converter can be connected in series or in parallel to output a variety of voltage ranges.

Figure 3:
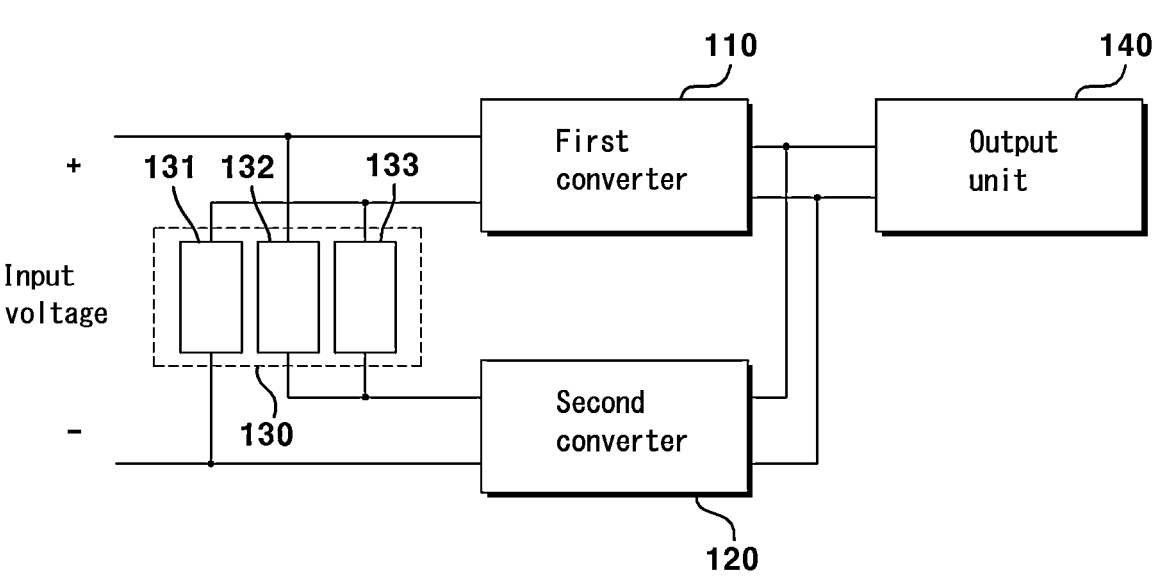
FIGS. 3 to 6 are diagrams for explaining the operation of a converter according to an embodiment of the present invention.

The switching unit 130 may include one or more switching elements. The switching element may be a physical switching element, such as a relay, or a semiconductor switching element, such as a transistor or an FET. In addition, various switching elements may be included. In order to connect the first converter 110 and the second converter 120 in series or in parallel, the switching unit 130 may include: a first switching element 131, a second switching element 132, and a third switching element 133. When including a plurality of switching elements, each switching element may be disposed as shown in FIG. 3.

The first switching element 131 is disposed between the (−) terminal of the first converter 110 and the (−) terminal of the second converter 120, the second switching element 132 is disposed between the (+) terminal of the first converter 110 and the (+) terminal of the second converter 120, and the third switching element 133 may be disposed between the (−) terminal of the first converter 110 and the (+) terminal of the second converter 120. When the first switching element 131 and the second switching element 132 are on and the third switching element 133 is off, the first converter 110 and the second converter 120 are connected in parallel; when the first switching element 131 and the second switching element 132 are off and the third switching element 133 is on, the first converter 110 and the second converter 120 are connected in series; and the first to third switching elements 131 to 133 may operate depending on the magnitude of the input voltage being applied to the converter. When the input voltage being applied to the converter is a first value, the first switching element 131 and the second switching element 132 are in an on state and the third switching element 133 is in an off state, and when the input voltage being applied to the converter is a second value, the first switching element 131 and the second switching element 132 may be in an off state and the third switching element 133 may be in an on state. Here, a first value may be a voltage smaller than the second value. When the input voltage is determined, the first value and the second value may be different types of input voltages and may be a voltage corresponding to input ranges having different ranges. Or, based on a reference value that is preset or set according to the rated voltage of each converter, the first value may be a voltage below the reference value, and the second value may be a voltage greater than the reference value.

Figure 4:
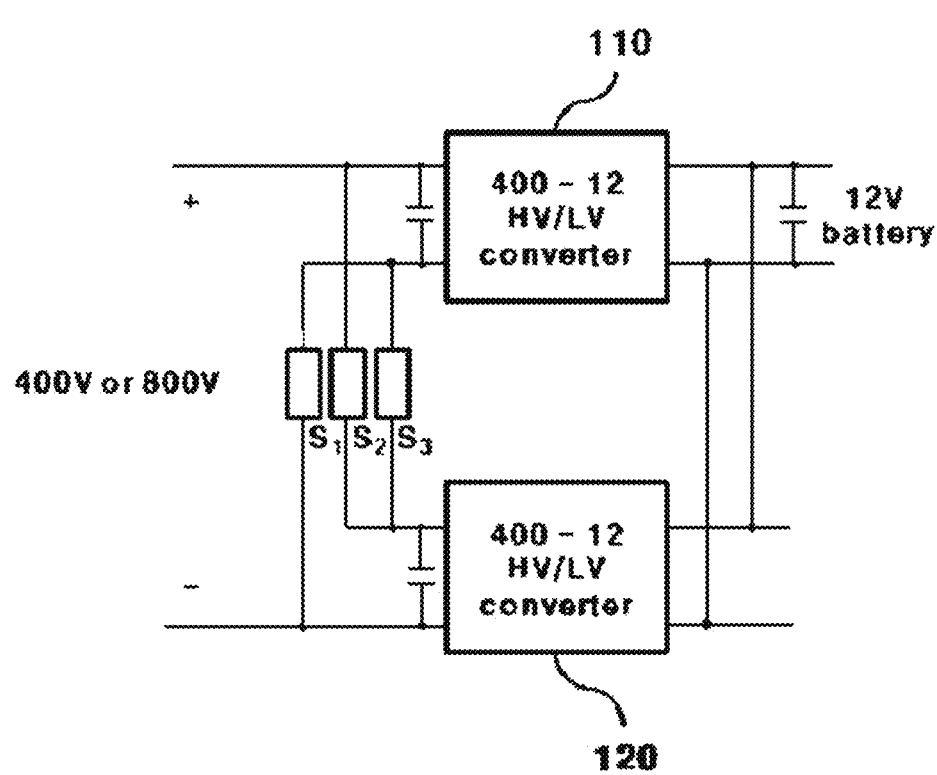

As shown in FIG. 4, the input voltage is 400 V or 800 V, the first converter 110 and the second converter 120 are 400-12 HV/LV converters, the switching unit 130 includes S1 to S3, and the 12 V being outputted from each converter can be provided by a battery. The converter is connected to a 400 V battery or an 800 V battery and can receive 400 V or 800 V input, respectively. Or, it is connected to an 800 V battery, and the output voltage of the battery can be 400 V or 800 V, or 400 V or 800 V can be inputted from an external power source.

Figures 5A, 5B:
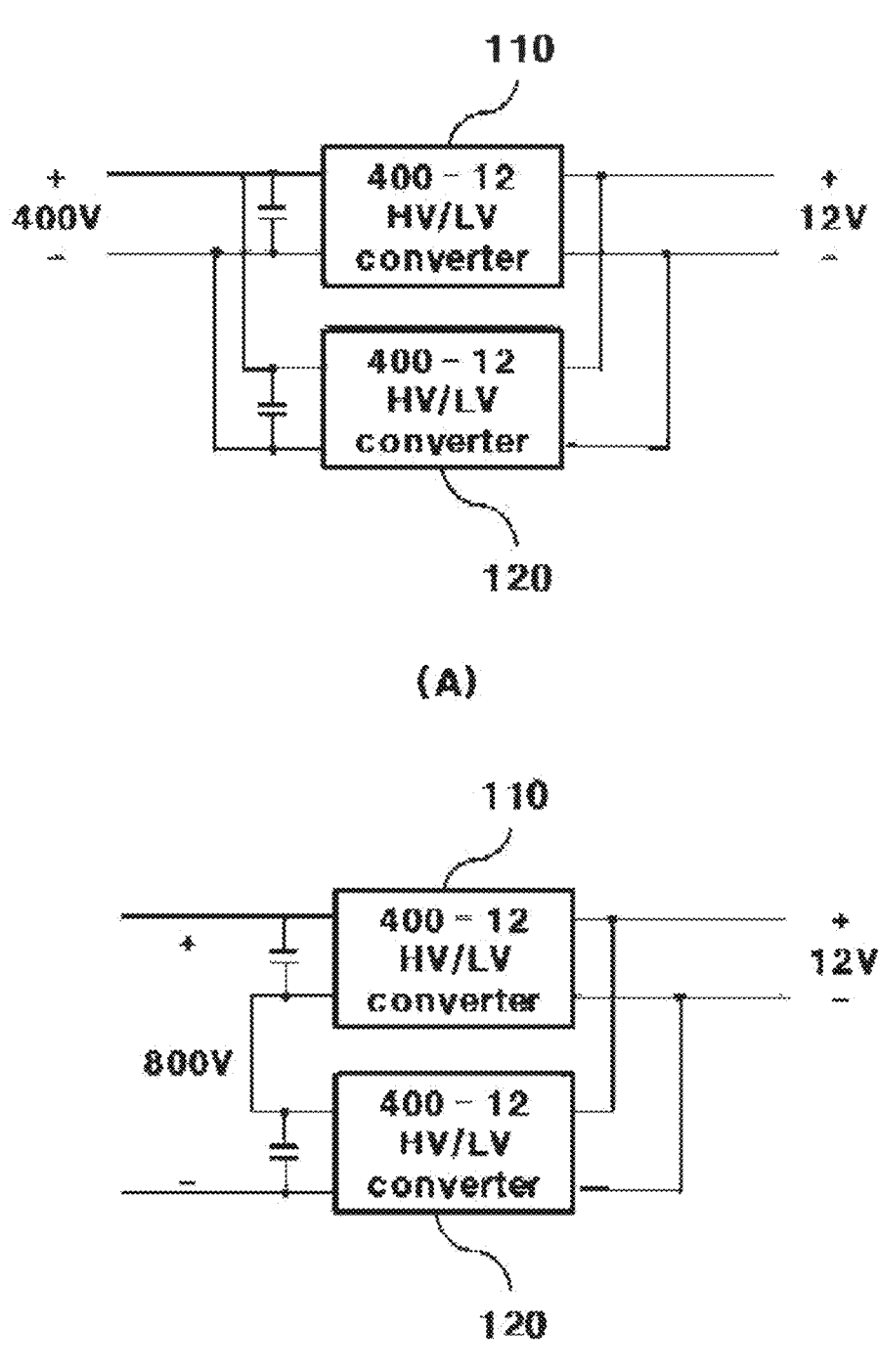
Figure 6:
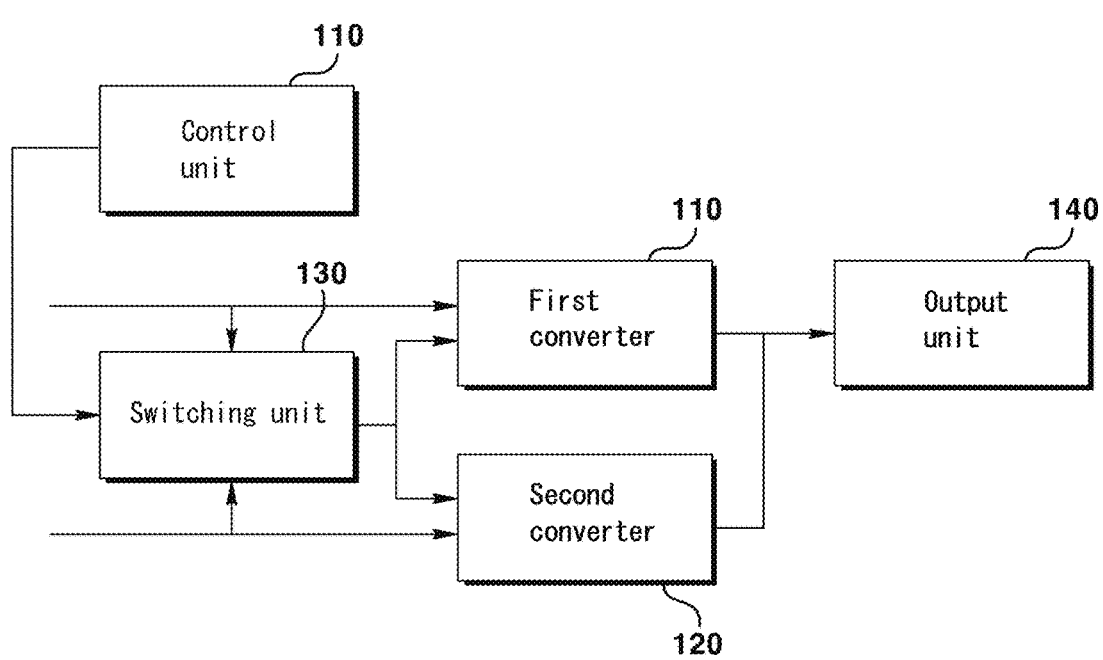

Depending on whether the input voltage is 400 V or 800 V, S1 to S3 being included in the switching unit 130 operate to connect the first converter 110 and the second converter 120 in series or in parallel. When the input voltage is 400 V, S1, the first switching element 131, and S2, the second switching element 132, are turned on, and S3, the third switching element 133, is turned off. The first converter 110 and the second converter 120 are connected in parallel. At this time, the first converter 110 and the second converter 120 are connected in parallel as shown in FIG. 5(A), and each converter converts the 400 V input voltage to 12 V and outputs it.

When the input voltage is 800 V, S1 and S2 are off and S3 is on, the first converter 110 and the second converter 120 are connected in series. At this time, the first converter 110 and the second converter 120 are connected in series as shown in FIG. 5(B), the input voltage of 800 V is divided and 400 V is inputted to each converter. Each converter converts the 400 V input voltage to 12 V and outputs it.

Even if the input voltage is 400 V or 800 V, conversion is possible with only a single type of converter by switching the connection status of the first converter 110 and the second converter 120. In other words, even if each converter is optimally designed for the input voltage of 400 V, it can also be applied to the input voltage of 800 V.

The first converter 110 and the second converter 120 are optimally designed with the same specifications and can be applied without design changes. By using a converter with the same specifications, it is possible to use a separate converter according to the range of input voltage or apply it to a wide range, without reducing the efficiency of the converter, and converting to high efficiency and size becomes possible. Therefore, efficiency degrading can be solved by using a different converter depending on the size of the input voltage or by designing the operating range of the converter to be wide in order to convert the entire range of voltage.

When the size of the input voltage becomes larger, such as 1200 V as well as 400 V and 800 V, an additional converter is included in addition to the first converter 110 and the second converter 120, but by changing the connection status of each converter depending on the input voltage, it can be used for a wider range of input voltages. Or, the specifications of the first converter 110 and the second converter 120 may be increased, and the degree of freedom in design can be increased by switching the connection states of the converters.

It may include a control unit 150 that controls the switching unit 130 according to the magnitude of the input voltage being applied to the converter. The control unit 150 senses the input voltage, or receives the input voltage sensed by a sensing unit (not shown) that senses the input voltage, and controls the switching unit 130 so that the connection states of the first converter 110 and the second converter 120 can be controlled differently so as to be suitable for each input voltage. When the switching element being included in the switching unit 130 is a semiconductor element, the control unit 150 may be a gate driver that provides the gate voltage of each switching element, and may control the switching elements through pulse width modulation (PWM). When the switching element is another type of switching element such as a relay, the switching unit 130 can be controlled by applying a signal to operate the corresponding switching element.

The control unit 150 controls the switching unit 130 to connect the first converter 110 and the second converter 120 in parallel when the magnitude of the input voltage is a first value, and may control the switching unit 130 so that the first converter 110 and the second converter 120 are connected in series when the magnitude of the input voltage is a second value. Here, a first value may be smaller than a second value.

Figure 7:
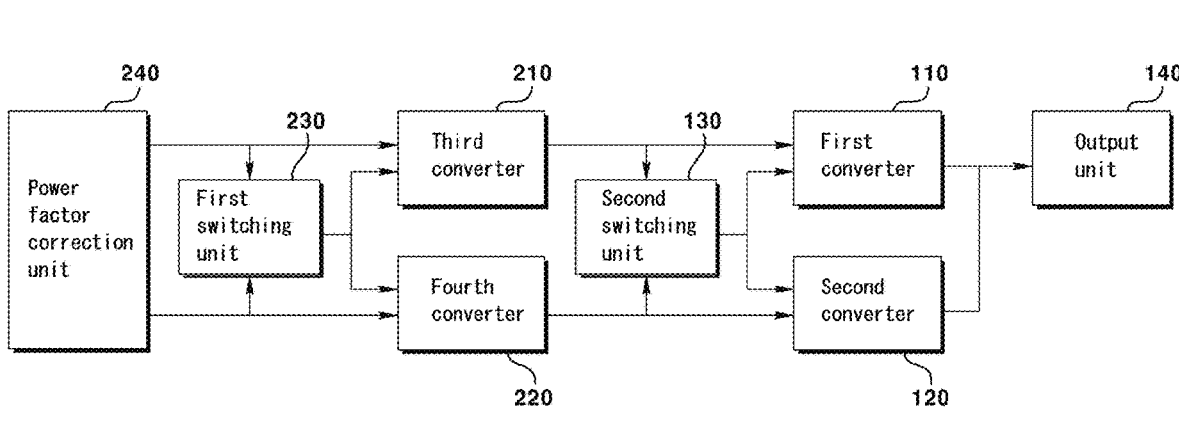
FIG. 7 is a block diagram of a power module according to an embodiment of the present invention.

FIG. 7 is a block diagram of a power module according to an embodiment of the present invention.

The power module 200 according to an embodiment of the present invention includes a power factor correction unit 240, a first converter 110, a second converter 120, a third converter 210, a fourth converter 220, a first switching unit 230, a second switching unit 130, and an output unit 140, and may include an input unit (not shown), a control unit (not shown), and the like. The power module 200 according to an embodiment of the present invention may include the vehicle's on board charger (OBC) and DC-DC converter as a power module being applied to electric vehicles that receives external power to charge the battery, and provides the battery or external power to devices inside the vehicle.

The power factor correction unit 240 converts an alternating current input into a direct current.

More specifically, the power factor correction unit 240 receives an alternating current input, corrects the power factor, and converts it to a direct current. The power factor correction unit 240 may be a power factor correction (PFC). It can operate in a single method or an interleaved method. AC power can be received through input parts such as the power port. Depending on the type of external power source being connected, either single-phase AC power or three-phase AC power can be inputted. When single-phase AC power is inputted, it is converted to DC power with a voltage of 380 to 400 V, and when three-phase AC power is inputted, it is converted to DC power with a voltage of 650 to 800 V.

The third converter 210 and the fourth converter 220 convert the output voltage of the power factor correction unit 240 into a second level voltage.

More specifically, the third converter 210 and the fourth converter 220 convert the voltage of a direct current power source being outputted from the power factor correction unit 240 into a second level voltage. The third converter 210 and the fourth converter 220 may be DC-DC converters, and the second level voltage may be a voltage suitable for the battery being connected to the rear end or the first converter 110 and the second converter 120. The second level voltage may be a fixed value or a variable value. When the second level voltage is a variable value, it may be a value variable to one of a plurality of types of voltage values or may be a value that is variable within a continuous range.

The third converter 210 and the fourth converter 220 convert the output voltage of the power factor correction unit 240 to a second level voltage that is suitable for the battery or the first converter 110 and the second converter 120 being connected to the rear end. The output voltage of the power factor correction unit 240 may be higher or lower than the voltage of the second level, and may be the same voltage within the error range; and the third converter 210 and the fourth converter 220 may be HV/HV converters that convert a high voltage to a high voltage. Here, HV may be a relative meaning which means that it is a higher voltage than the voltage being outputted by the first converter 110 and the second converter 120. For example, the output voltage of the power factor correction unit 240 may be 400 V or 700 V, the voltage being outputted through the third converter 210 and the fourth converter 220 is 400 V to 800 V, and the third converter 210 and the fourth converter 220 may be 400-400 HV/HV converters. Or, the third converter 210 and the fourth converter 220 may be an HV-HV converter, an LV-LV converter, or an LV-HV converter. The output voltage of the power factor correction unit 240, 400 V or 700 V, represents a representative value and may be a voltage with a certain range.

The third converter 210 and the fourth converter 220 may be converters having the same specifications. Here, identical specifications mean that there is a difference in specifications within an error range or critical range, and it is natural that it does not mean complete identicalness. They can have the same specifications in terms of rated voltage, voltage transformation ratio, power, and the like. For example, the third converter 210 and the fourth converter 220 may have a voltage transformation ratio that converts a voltage in the range of 380 V to 400 V to 400 V, and may be a converter with a power of 5 KW. Or, it is natural that the third converter 210 and the fourth converter 220 may be converters with different specifications. In addition, according to the specifications of the converter or the magnitude of the AC power source, an additional converter being connected in series or in parallel with the third converter 210 and the fourth converter 220 may be further included.

The first switching unit 230 connects the third converter 210 and the fourth converter 220 in series or in parallel.

More specifically, the first switching unit 230 may perform a switching operation so that the third converter 210 and the fourth converter 220 are connected in series or in parallel. The first switching unit 230 is connected to the input terminal of the third converter 210 and the input terminal of the fourth converter 220, and here, the positions in series or parallel mean the input terminal of the third converter 210 and the input terminal of the fourth converter 220. Unless the output terminal of each converter is specified separately, hereinafter, serial or parallel connection refers to the input terminal of each converter.

When the third converter 210 and the fourth converter 220 are connected in series, the input voltage is divided and inputted to each converter, and when connected in parallel, the input voltage is equally inputted to each converter. The first switching unit 230 operates according to the input voltage being inputted to the converter to connect the third converter 210 and the fourth converter 220 in series or in parallel. When the output voltage of the power factor correction unit 240 is within the rated voltage range of each of the third converter 210 and the fourth converter 220, the third converter 210 and the fourth converter 220 are connected in parallel to convert the output voltage of the power factor correction unit 240; and when the output voltage of the power factor correction unit 240 is greater than the rated voltage range of each converter, the third converter 210 and the fourth converter 220 can be connected in series to distribute and convert the output voltage of the power factor correction unit 240. Through this, a conversion operation is possible even if a voltage greater than the rated voltage of each converter is outputted from the power factor correction unit 240 and it can be designed so that the conversion is performed in a high efficiency range rather than a wide range of rated voltage. When the output voltage of the power factor correction unit 240 is of multiple types or has a wide voltage range, each converter may be designed to convert a lower input voltage among different types of input voltage, or a converter with a corresponding rated voltage may be used; and when the output voltage of the power factor correction unit 240 that is greater than the rated voltage for which each converter is designed is inputted, the output voltage of the power factor correction unit 240 can be converted through voltage distribution. That is, by connecting the third converter 210 and the fourth converter 220 in series or in parallel, it is possible to be used for multiple types or a wide range of output voltages of the power factor correction unit 240. For example, the output voltage of the power factor correction unit 240 may be 400 V or 700 V, and each converter may be a converter that converts 400 V to 400 V. When the output voltage of the power factor correction unit 240 is 400 V, the third converter 210 and the fourth converter 220 are connected in parallel, and when the output voltage of the power factor correction unit 240 is 700 V, the third converter 210 and the fourth converter 220 are connected in series. When connected in series, the voltage being inputted to each converter is 350 to 400 V due to voltage distribution. In other words, even if the output voltage of the power factor correction unit 240 is different, each converter only needs to convert 400 V to 12 V, which can increase efficiency.

The first converter 110 and the second converter 120 convert the input voltage into a first level voltage. Here, second level may be a voltage greater than the first level. For example, the second level may be 400 V and the first level may be 12 V. Of course, this may vary depending on the input voltage and output voltage of the device to which the power module 200 is applied. The second switching unit 130 connects the first converter 110 and the second converter 120 in series or in parallel. The output unit 140 includes an output unit in which the output terminal of the first converter 110 and the output terminal of the second converter 120 are connected in parallel. Here, since a detailed description of the first converter 110, the second converter 120, and the output unit 140 corresponds to the first converter 110, the second converter 120, and the output unit 140 being included in the converter 100 of FIGS. 1 to 6, hereafter, overlapping explanations will be omitted.

The output terminal of the third converter 210 is connected to the input terminal of the first converter 110, and the output terminal of the fourth converter 220 is connected to the input terminal of the second converter 120. Therefore, the third converter 210 and the first converter 110 can be viewed as operating as one converter, and the fourth converter 220 and the second converter 120 can be seen as operating as one converter. That is, when the first converter 110 and the second converter 120 are connected in series or in parallel by the operation of the second switching unit 130, the output terminal of the third converter 210 and the output terminal of the fourth converter 220 are also connected in series or in parallel accordingly.

When the battery, which will be described later, is connected, the second switching unit 130 operates according to the voltage of the battery, but when the battery is not connected, it may operate according to the operation of the first switching unit 230.

When the power being inputted to the power factor correction unit 240 is outputted as is to the output unit 140 and transmitted to the load, the first switching unit 230 and the second switching unit 130 may operate in the same manner. The first switching unit 230 connects the third converter 210 and the fourth converter 220 in series, the second switching unit 130 connects the first converter 110 and the second converter 120 in series, or the first switching unit 230 connects the third converter 210 and the fourth converter 220 in parallel, and the second switching unit 130 may connect the first converter 110 and the second converter 120 in parallel. Since the first switching unit 230 operates according to the output voltage being outputted by the power factor correction unit 240, the second switching unit 130 may also operate according to the output voltage being outputted by the power factor correction unit 240.

When the AC power being applied to the power factor correction unit 240 is single-phase, the first switching unit 230 connects the third converter 210 and the fourth converter 220 in parallel, and the second switching unit 130 may connect the first converter 110 and the second converter 120 in parallel; and when the AC power being supplied to the power factor correction unit 240 is 3-phase, the first switching unit 230 connects the third converter 210 and the fourth converter 220 in series, and the second switching unit 130 may connect the first converter 110 and the second converter 120 in series.

Or, the first switching unit 230 operates according to the output voltage being outputted from the power factor correction unit 240, but the second switching unit 130 may operate differently from the first switching unit 230. For example, when the first switching unit 230 connects the third converter 210 and the fourth converter 220 in series, the second switching unit 130 may connect the third converter 210 and the fourth converter 220 in parallel. At this time, the output terminal of the third converter 210 and the output terminal of the fourth converter 220 are connected in parallel. Conversely, when the first switching unit 230 connects the third converter 210 and the fourth converter 220 in parallel, the second switching unit 130 may connect the third converter 210 and the fourth converter 220 in series. At this time, the output terminal of the third converter 210 and the output terminal of the fourth converter 220 are connected in series.

When the second switching unit 130 operates, since power consumption for the switching operation occurs, even if the state of the first switching unit 230 changes, the previous state can be maintained, and either parallel or serial connection can be operated as default.

A battery input/output terminal being connected between the output terminal of the third converter 210 and the input terminal of the first converter 110 and between the output terminal of the fourth converter 220 and the input terminal of the second converter 120 may be included. The output voltages of the third converter 210 and the fourth converter 220 can charge the battery through the battery input/output terminal being connected to the rear end. Electric vehicles charge their batteries with an external power source, and the external power source may charge the battery through the power factor correction unit 240, the third converter 210, and the fourth converter 220 by being converted to a voltage suitable for charging the battery. Depending on the capacity of the battery being connected to the battery input/output terminal, the second switching unit 130 may connect the output terminal of the third converter 210 and the output terminal of the fourth converter 220 in series or in parallel.

Depending on the voltage being outputted from the power factor correction unit 240, the third converter 210 and the fourth converter 220 are connected in series or in parallel and output a second level voltage. When the capacity of the battery being connected to the battery input/output terminal is a first value, the second switching unit 130 connects the output terminal of the third converter 210 and the output terminal of the fourth converter 220 in parallel; and when the capacity of the battery is a second value, the second switching unit 130 may connect the output terminal of the third converter 210 and the output terminal of the fourth converter

220 in series. Here, the first value may be a voltage smaller than the second value, and the second value may be a value greater than the second level voltage above the error range.

That is, when the capacity of the battery is a first value corresponding to the rated voltage of the third converter 210 or fourth converter 220 that outputs a second level voltage, the second switching unit 130 connects the output terminal of the third converter 210 and the output terminal of the fourth converter 220 in parallel, and may charge the battery by transmitting the voltage being outputted from the third converter 210 and the fourth converter 220 in parallel to the battery. When the capacity of the battery is a second value greater than the rated voltage of the third converter 210 or fourth converter 220 that outputs a second level voltage, the second switching unit 130 connects the output terminal of the third converter 210 and the output terminal of the fourth converter 220 in series, and may charge the battery by transmitting the sum of the voltages being outputted from the third converter 210 and the fourth converter 220 to the battery. Through this, a battery with a capacity of a first value and a battery with a capacity of a second value can be connected in combined ways.

The first converter 110 and the second converter 120 may receive the output voltage of the third converter 210 and the output voltage of the fourth converter 220, respectively, or may receive the battery voltage from the battery input/output terminal. When the battery is not connected or the battery is not charged, the output voltage of the third converter 210 and the output voltage of the fourth converter 220 are respectively received and converted, and the converted voltage can be provided to the load from the output unit 140. When a charged battery is connected to the battery input/output terminal, the first converter 110 and the second converter 120 respectively receive the battery voltage and convert it, and may provide the converted voltage to the load from the output unit 140.

When the voltage of the battery being connected to the battery input/output terminal is a first value, the first converter 110 and the second converter 120 are connected in parallel; and when the voltage of the battery being connected to the battery input/output terminal is a second value, the first converter 110 and the second converter 120 are connected in series. When a battery is connected to the battery input/output terminal, the battery voltage is inputted to the first converter 110 and the second converter 120. Depending on the voltage of the battery, the first converter 110 and the second converter 120 are connected in series or in parallel corresponding to the operations of the first converter 110 and the second converter 120 of FIGS. 1 to 6.

As previously described, since the output terminal of the third converter 210 is connected to the input terminal of the first converter 110 and the output terminal of the fourth converter 220 is connected to the input terminal of the second converter 120, the connection state of the output terminal of the third converter 210, the input terminal of the first converter 110, the output terminal of the fourth converter 220, and the input terminal of the second converter 120 is determined depending on the capacity of the battery being connected to the battery input/output terminal.

Figure 8:
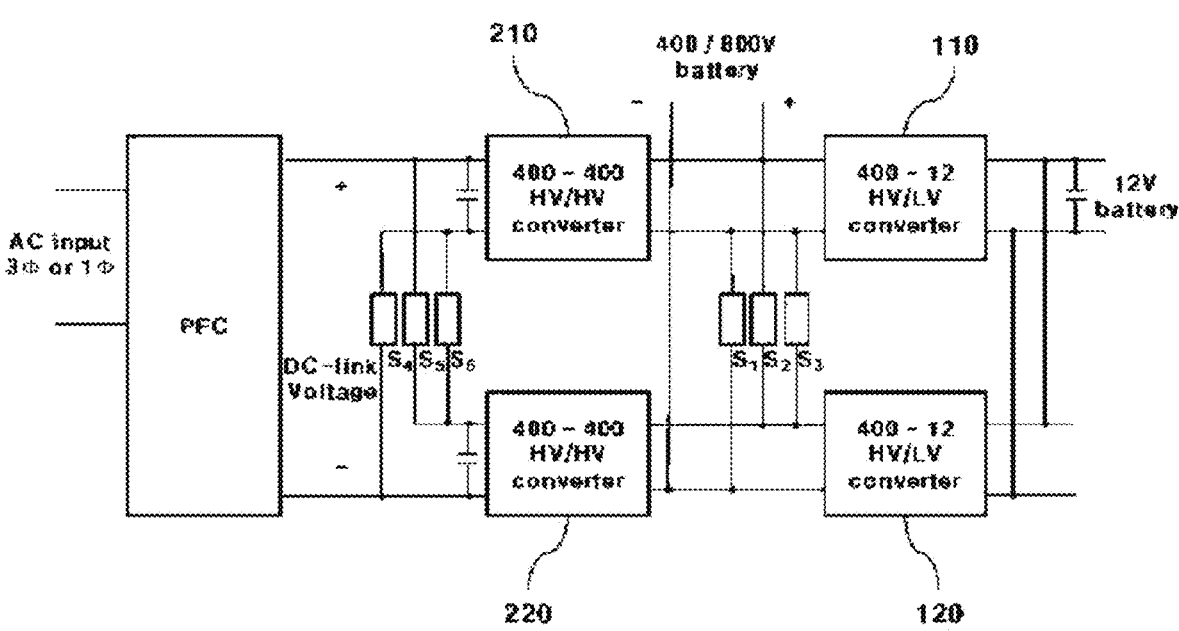

The power module 200 according to an embodiment of the present invention may be implemented as shown in FIG. 8. The power factor correction unit 240 is implemented as a PFC and receives single-phase or three-phase alternating current and converts it into a direct current, and according to the DC link voltage, which is the output voltage of the power factor correction unit 240, the first switching unit 230 connects the third converter 210 and the fourth converter 220 in series or in parallel. A battery may be respectively connected across the third converter 210, the fourth converter 220, the first converter 110, and the second converter 120; and the second switching unit 130 connects the first converter 110 and the second converter 120 in series or in parallel depending on the capacity of the battery. Since the output terminal of the third converter 210 is connected to the input terminal of the first converter 110, and the output terminal of the fourth converter 220 is connected to the input terminal of the second converter 120, the output terminal of the third converter 210 and the output terminal of the fourth converter 220 are also connected in series or in parallel by the operation of the second switching unit 130. The output terminals of the first converter 110 and the second converter 120 are connected in parallel and provided as a load connected to the output unit 140.

The first switching unit 230 may include one or more switching elements and may include fourth to sixth switching elements. The operation of the fourth to sixth switching elements connecting the third converter 210 and the fourth converter 220 in series or in parallel corresponds to the operation in which the first to third switching elements 131 to 133 of FIGS. 1 to 6 connect the first converter 110 and the second converter 120 in series or in parallel.

The first switching unit 230 may comprise: a fourth switching element being disposed between the (−) terminal of the third converter 210 and the (−) terminal of the fourth converter 220; a fifth switching element being disposed between the (+) terminal of the third converter 210 and the (+) terminal of the fourth converter 220; and a sixth switching element being disposed between the (−) terminal of the third converter 210 and the (+) terminal of the fourth converter 220. The fourth to sixth switching elements may be relays or semiconductor switching elements, and may be disposed as S4 to S6 in FIG. 8.

When the alternating current voltage being inputted to the power factor correction unit 240 is single-phase, the fourth switching element S4 and the fifth switching element S5 are in an on state and the sixth switching element S6 is in an off state; and when the alternating current voltage being inputted to the power factor correction unit 240 is three-phase, the fourth switching element S4 and the fifth switching element S5 may be in an off state and the sixth switching element S6 may be in an on state.

Figures 9A, 9B:
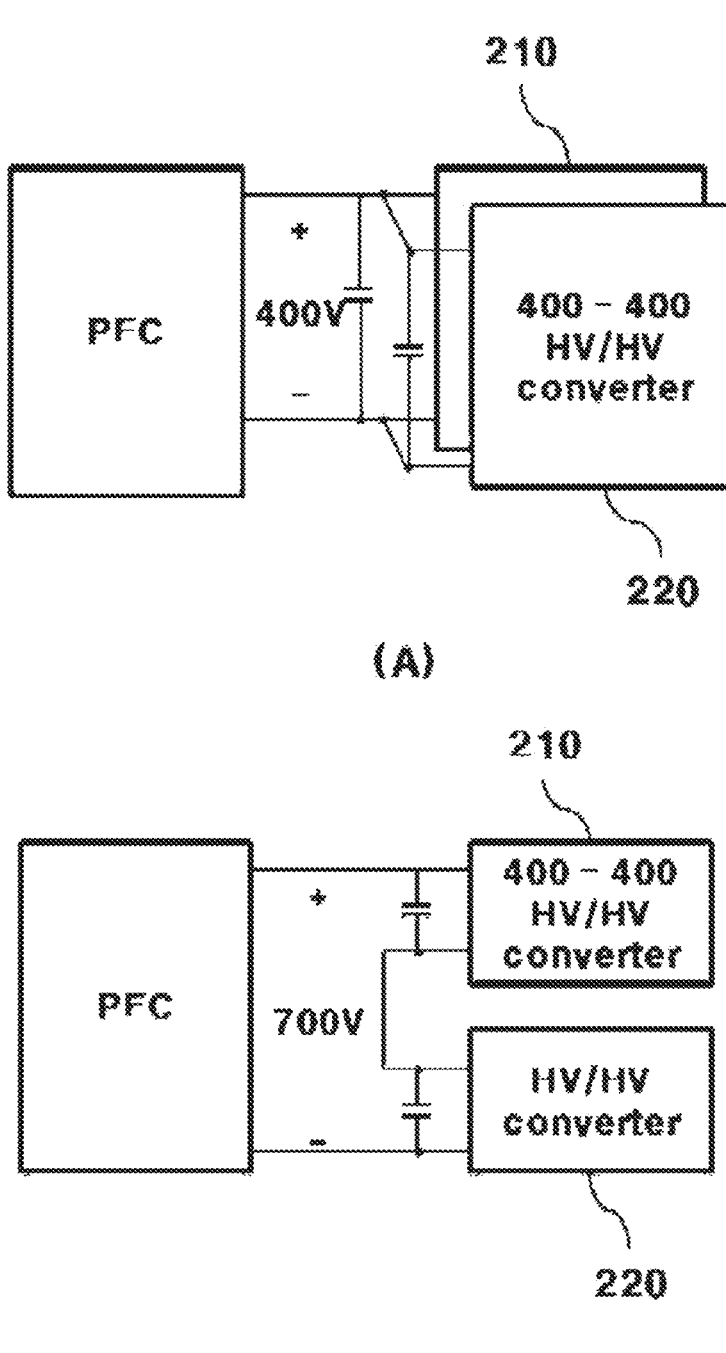

When the alternating voltage being inputted to the power factor correction unit 240 is single phase, the output voltage being outputted from the power factor correction unit 240 may be 400 V, as shown in FIG. 9(A), and at this time, the fourth switching element S4 and the fifth switching element S5 are turned on and the sixth switching element S6 is turned off so that the third converter 210 and the fourth converter 220 are connected in parallel. The third converter 210 and fourth converter 220 may be 400-400 HV/HV converters, and each of them respectively receives 400 V in parallel to charge the battery or change it to 400 V corresponding to the input voltage of the first converter 110 and the second converter 120.

When the alternating current voltage being inputted to the power factor correction unit 240 is three-phase, the output voltage being outputted from the power factor correction unit 240 may be 700 V, as shown in FIG. 9(B), and at this time, the fourth switching element S4 and the fifth switching element S5 are turned off and the sixth switching element S6 is turned on so that the third converter 210 and fourth converter 220 are connected in series. The third converter 210 and fourth converter 220 may be 400-400 HV/HV converters, the output voltage of 700 V is voltage divided, and each of the third converter 210 and the fourth converter 220 respectively receives 350 V to charge the battery or may convert it to 400 V corresponding to the input voltage of the first converter 110 and the second converter 120.

The front end of the converter can include a capacitor to reduce or eliminate ripple. Here, the capacitor may be an electrolytic capacitor. The capacity of the electrolytic capacitor increases proportionally according to the magnitude of the voltage being inputted to the converter. Since the power module or converter according to an embodiment of the present invention uses a single converter with a small capacity compared to the input voltage, the size of the voltage being inputted to each converter becomes smaller compared to converters that must cover the entire range without changing the connection status, so the capacity of the electrolytic capacitor can be reduced. In other words, without connecting multiple electrolytic capacitors in series or using a large capacitance electrolytic capacitor for a large input voltage, it is possible to reduce ripples with a small number of electrolytic capacitors, and thus, there is an effect of reducing the electrolytic capacitor, which can improve power density. This can be equally applied to electrolytic capacitors that may be included in the front end of the first converter 110 and the second converter 120, thereby improving the power density of the entire device.

The second switching unit 130 may comprise: a first switching element 131 being disposed between the (−) terminal of the first converter 110 and the (−) terminal of the second converter 120; a second switching element 132 being disposed between the (+) terminal of the first converter 110 and the (+) terminal of the second converter 120; and a third switching element 133 being disposed between the (−) terminal of the first converter 110 and the (+) terminal of the second converter 120. The detailed description of the first to third switching elements corresponds to the first to third switching elements 131 to 133 of the converter of FIGS. 1 to 6.

Depending on whether the voltage of the battery being connected to the battery input/output terminal is 400 V or 800 V, S1 to S3 included in the second switching unit 130 operate to connect the first converter 110 and the second converter 120 in series or in parallel. Accordingly, the output terminal of the third converter 210 and the output terminal of the fourth converter 220 are also connected in series or in parallel.

When the battery voltage is 400 V, S1, which is the first switching element 131, and S2, which is the second switching element 132, are turned on, and S3, which is the third switching element 133, is turned off, so that the first converter 110 and the second converter 120 are connected in parallel, and the output terminal of the third converter 210 and the output terminal of the fourth converter 220 are also connected in parallel. At this time, the output terminal of the third converter 210 and the output terminal of the fourth converter 220 are connected in parallel, as shown in FIG. 10(A), so that the 400 V being outputted respectively charges the battery of 400 V in parallel; and the first converter 110 and the second converter 120 are connected in parallel, so that each converter receives the 400 V voltage of the battery as input in parallel and converts it to 12 V, and outputs it.

When the battery voltage is 800 V, S1, which is the first switching element 131, and S2, which is the second switching element 132, are turned off, and S3, which is the third switching element 133, is turned on, thereby connecting the first converter 110 and the second converter 120 in series, and the output terminal of the third converter 210 and the output terminal of the fourth converter 220 are also connected in series. At this time, the output terminal of the third converter 210 and the output terminal of the fourth converter 220 are connected in series as shown in FIG. 10(B), and the 400 V being connected in series and respectively outputted from each is added to charge the battery of 800 V; and the first converter 110 and the second converter 120 are connected in series, and the voltage of 800 V of the battery is distributed and inputted as 400 V to each converter, so that each converter converts the 400 V input voltage to 12 V and outputs it.

Even if the battery voltage is 400 V or 800 V, conversion is possible with only a single type of converter by switching the connection status of the output terminal of the third converter 210 and the output terminal of the fourth converter 220 and the first converter 110 and the second converter 120. In other words, even if each converter is optimized for a 400 V battery voltage, it can also be used for an 800 V battery voltage in combined ways.

As previously described, even if single-phase and three-phase inputs or batteries of multiple types of capacity are connected a single converter can be used in combined ways through serial or parallel connection control. Through this, the design range is reduced due to a small change in the magnitude of the voltage being inputted to each converter, and an optimal design for the corresponding voltage becomes possible, thereby increasing the efficiency thereof. Therefore, maximum power can be transmitted regardless of the size of the battery voltage. In addition, it is advantageous in terms of size and cost.

When processing a wide range depending on battery capacity, internal components must use devices with high specifications in consideration of battery voltage, but however, according to an embodiment of the present invention, devices with low specifications can be used because they can be used in combined ways. For example, the voltage being inputted to each converter is about 400 V, so a 650 V semiconductor device can be used. In addition, it only needs to withstand low voltages, so rather than semiconductor devices that can operate at high voltages but have poor performance, high-performance devices such as GAN that operates at low voltages but have high efficiency can be used, thereby increasing the design freedom by considering efficiency and cost.

Those skilled in the art related to this embodiment will understand that the above-described base material can be implemented in a modified form without departing from the essential characteristics. Therefore, the disclosed methods should be considered from an explanatory rather than a restrictive perspective. The scope of the present invention is indicated in the claims rather than the foregoing description, and all differences within the equivalent scope should be construed as being included in the present invention.

The invention claimed is:

1. A power module comprising:
a power factor correction unit configured to convert an alternating current input into a direct current;
a third converter and a fourth converter configured to convert an output voltage of the power factor correction unit into a second level voltage;
a first converter and a second converter configured to convert an input voltage into a first level voltage;
a first switching unit connecting the third converter and the fourth converter in series or in parallel;
a second switching unit connecting the first converter and the second converter in series or in parallel; and an output unit to which an output terminal of the first converter and an output terminal of the second converter are connected in parallel,
wherein an output terminal of the third converter is connected to an input terminal of the first converter, and
wherein an output terminal of the fourth converter is connected to an input terminal of the second converter.

2. The power module according to claim 1, comprising:
a battery input/output terminal connected between the output terminal of the third converter and the input terminal of the first converter, and between the output terminal of the fourth converter and the input terminal of the second converter.

3. The power module according to claim 2,
wherein the first converter and the second converter receive an output voltage of the third converter and an output voltage of the fourth converter, respectively, or receive a battery voltage from the battery input/output terminal.

4. The converter according to claim 1,
wherein when the input voltage applied to the converter is a second value, the first switching element and the second switching element are in an off state and the third switching element is in an on state.

5. The converter according to claim 4,
wherein the first value is smaller than the second value.

6. The converter according to claim 1,
wherein the control unit controls the switching unit so that the first converter and the second converter are connected in series when the magnitude of the input voltage is a second value.

7. The power module according to claim 2,
wherein when a voltage of the battery connected to the battery input/output terminal is a first value, the first converter and the second converter are connected in parallel.

8. The power module according to claim 7,
wherein when the voltage of the battery connected to the battery input/output terminal is a second value, the first converter and the second converter are connected in series.

9. The power module according to claim 8,
wherein the first value is smaller than the second value.

10. The power module according to claim 2,
wherein the first switching unit comprises:
a fourth switching element disposed between a (−) terminal of the third converter and a (−) terminal of the fourth converter;
a fifth switching element disposed between a (+) terminal of the third converter and a (+) terminal of the fourth converter; and
a sixth switching element disposed between the (−) terminal of the third converter and the (+) terminal of the fourth converter.

11. The power module according to claim 10,
wherein when the alternating current voltage inputted to the power factor correction unit is single-phase, the fourth switching element and the fifth switching element are in an on state and the sixth switching element is in an off state; and
wherein when the alternating current voltage inputted to the power factor correction unit is three-phase, the fourth switching element and the fifth switching element are in an off state and the sixth switching element is in an on state.

12. The power module according to claim 2, wherein the second switching unit comprises:

a first switching element disposed between a (−) terminal of the first converter and a (−) terminal of the second converter;

a second switching element disposed between a (+) terminal of the first converter and a (+) terminal of the second converter; and a third switching element disposed between the (−) terminal of the first converter and the (+) terminal of the second converter.

13. The power module according to claim 2, wherein the second level is larger than the first level.

* * * * *